W. H. SMITH.
SPRING WHEEL.
APPLICATION FILED NOV. 24, 1920.
1,392,859.
Patented Oct. 4, 1921.
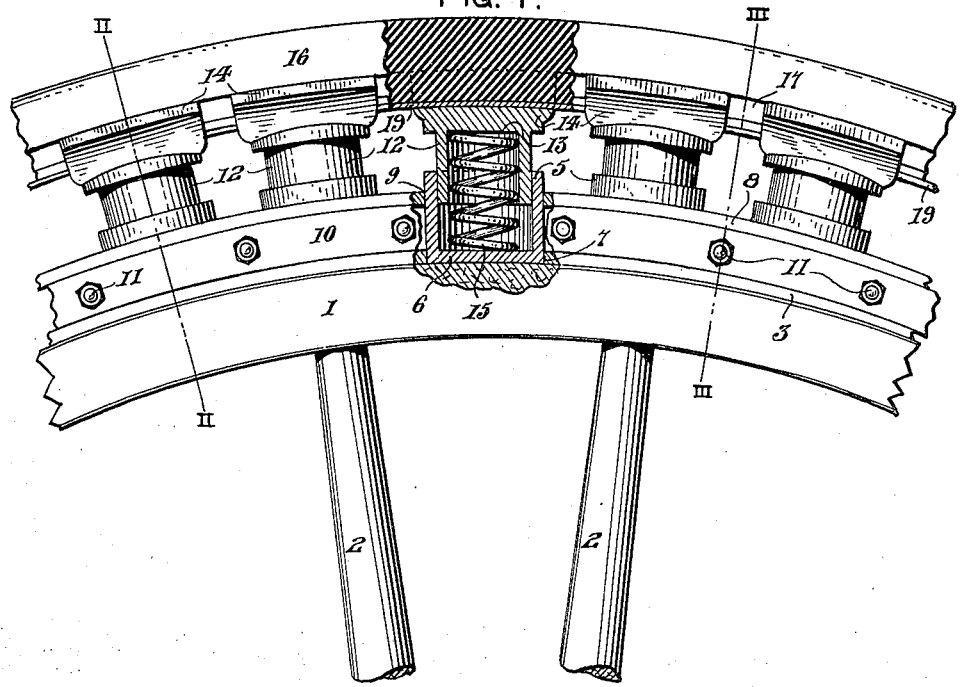
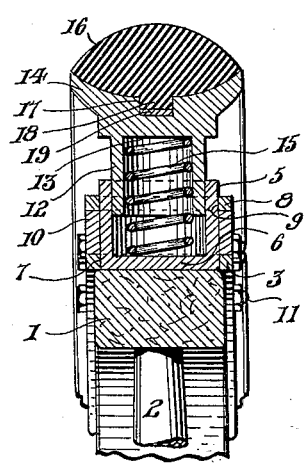
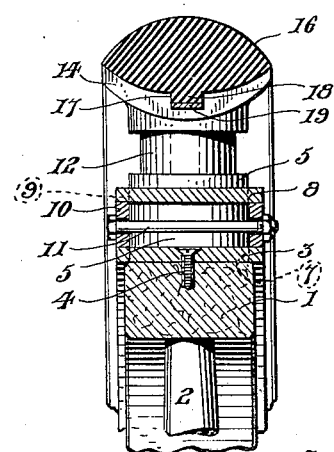
Inventor
William H. Smith
By James L. Jenks
Attorney

UNITED STATES PATENT OFFICE.

WILLIAM H. SMITH, OF BRIDGEPORT, CONNECTICUT.

SPRING-WHEEL.

1,392,859.	Specification of Letters Patent.	Patented Oct. 4, 1921.

Application filed November 24, 1920. Serial No. 426,147.

*To all whom it may concern:*

Be it known that I, WILLIAM H. SMITH, a citizen of the United States of America, residing at Bridgeport, in the county of Fairfield and State of Connecticut, have invented certain new and useful Improvements in Spring-Wheels, of which the following is a specification.

This invention relates to certain new and useful improvements in spring wheels and has for one of its objects to provide a wheel especially constructed for automobiles and having a plurality of radial compression springs arranged adjacent the wheel periphery to cushion the wheel in lieu of the usual pneumatic tire.

A further object of the invention is to provide a spring wheel for motor vehicles wherein there are provided inner and outer rim sections or bands with radial compression springs disposed between the bands and inclosed by telescoping cup members, the walls of which are in intimate contact to provide for air pockets within the telescoping members to assist the springs in absorbing shocks, a cushion tire being supported on the outer rim member.

A still further object of the invention resides in the provision of a spring wheel having inner and outer rim members supporting opposed telescoping members inclosing compression springs with protecting plates associated with the inner elements of the telescoping members to protect the side walls of said members and to prevent injury thereto by lateral skidding of the wheel and also to prevent the collection of dirt and other foreign matter in proximity of the mounting bases of the inner telescoping members.

This invention is a continuation in part, so far as disclosed in my prior application for resilient tires for wheel of vehicles, filed July 12, 1919, Serial No. 310,496, and provides for certain improvements in details of construction and apparent novelty not expressed therein.

With the above general objects in view and others that will appear as the nature of the invention is better understood, the same consists in the novel form, combination and arrangement of parts hereinafter more fully described, shown in the accompanying drawing and claimed.

In the drawing, wherein like reference characters designate corresponding parts throughout the several views,—

Figure 1 is a fragmentary side elevational view, partly in section of a wheel constructed in accordance with the present invention and showing in section one of the telescoping members inclosing a spiral spring.

Fig. 2 is a cross sectional view taken on line II—II of Fig. 1 showing the inner telescoping member disposed within an opening or set in the felly band and the outer telescoping member supporting a cushioned tire, and Fig. 3 is a cross sectional view taken on line III—III of Fig. 1 showing the connecting bolts between the side rings arranged at opposite sides of the wheel.

Briefly described, the present invention aims to provide a spring wheel especially adapted for motor vehicles, the wheel embodying inner and outer rim sections, the inner rim section including the wheel felly and band suitably secured thereto with spaced openings in the band for receiving the inner ends of the cup-shaped telescoping members. An annular band having spaced openings therein is positioned outwardly of the felly band and spaced therefrom by side rings secured by transverse bolts. Outer telescoping members or plungers of inverted cup-shaped form are slidably received within the cup shaped telescoping members while a compression coil spring is disposed within each telescoping member, the springs bearing upon the bottom walls of the inner cup-shaped members to retain the same properly positioned within the openings in the felly band. A cushioned tire is supported on the outer ends of the plunger members while a resilient ring is positioned between the inner face of the cushioned tire and the outer faces of the plunger members.

Referring more in detail to the accompanying drawings there is illustrated a spring wheel especially constructed for use upon motor vehicles to function in lieu of the usual automobile wheel provided with a pneumatic tire, the wheel including a felly 1 supported on radial spokes 2. As shown in Fig. 3 a felly band 3 is mounted on the felly 1 and is secured thereto at intervals by fastening screws 4 passing through the band 3 and entering the felly, the fastening members 4 retaining the band on the felly in proper position.

A plurality of cushioned telescopic and radially positioned plunger elements are associated with the felly and band, each including a cup-shaped member 5 open at its outer end and having a closed bottom wall 6 received in an opening 7 provided in the band 3 with the bottom wall 6 of the cup directly seated on the felly 1. To protect the mountings of the cup-shaped members 5, an annular band 8 is provided with a plurality of openings 9 alined with the openings 7 in the band 3 and through which openings the upper ends of the cup-shaped members 5 project as illustrated. To protect the inner sections 5 of the telescoping members, side rings 10 are provided and rest at their inner edges upon the outer face of the felly band 3 with the outer edges thereof disposed for engagement with the inner face of the outer band 8, transverse bolts 11 connecting the side rings 10, a bolt extending between adjacent cups 5 with the rings 10 engaging the opposite sides of the cups. By the provision of the band 8 and side rings 10 the inner cup shaped members are completely protected so that injury thereto will be eliminated should the wheel laterally skid into an abutment, while the collection of foreign matter or other substances around the base mountings of the cups is impossible in view of the inclosure formed by the band and rings.

Outer telescopic plunger members are associated with the cups 5, each including an annular side wall 12 open at its inner end and closed at the outer end thereof as shown at 13, the outer end of each plunger member carrying a head formed of side flanges 14 for supporting a cushioned tire. A compression coil spring 15 is disposed within each telescoping member engaging at the inner ends the bottom walls 6 of the cups 5 and at their outer ends the closed ends 13 of the plunger members. In addition to the springs performing the function of shock absorbers during the forward travel of the wheel, the springs also retain the cups 5 seated within the openings 7 of the felly rim 3 against displacement therefrom.

A cushioned tire 16 incloses the outer ends of the plungers 12 and has an interlocking connection with the plungers by the provision of circumferential grooves 17 formed in the outer faces of the plungers into which a flange 18 carried by the inner face of the tire is received while an annular resilient band 19 is disposed in the bottoms of said grooves 17 beneath the tire flange 18.

The load placed upon the wheel is sustained by the springs at the lower side of the wheel while the springs at the upper side of the wheel are brought into play during the forward travel of the wheel. The telescoping plunger members during compression have the shocks and jars incident to the forward travel of the wheel absorbed by the springs contained therein, the compression of the spring being lessened by the air compressed within the telescoping members. It will therefore be seen that a spring wheel is provided which will possess the usual resiliency of a wheel provided with a pneumatic tire tread and it will also be noted that a wheel of this construction embodies comparatively few parts which are liable to injury during use. The inner cup members 5 are fully protected by the band 8 and side rings 10 while the springs 15 maintain the cups properly seated within the openings provided therefor in the felly band 3. The tightening of the connecting bolts 11 between the side rings 10 which are in engagement with the opposite sides of the cups 5 will provide for a substantially rigid mounting of the cups and will eliminate all rattling or shifting movements of the cups. The interlocking connection between the cushioned tire 16 and the heads of the plungers 12 will prevent side slipping of the tire 16 on the plungers while the band 19 inclosing the plungers will relieve the outward radial strains on the tire 16. It is not intended to limit this application to the provision of a single circumferential series of plunger elements, as in the construction of heavy truck wheels two or more laterally positioned circular series of plungers may be provided while the strength of the springs may also be varied, and each telescoping member may include one or more springs, the gist of this invention principally residing in the mounting of the plunger members relative to the wheel felly and tire.

While there is herein shown and described the preferred embodiment of the present invention, it is nevertheless to be understood that minor changes may be made therein without departing from the spirit and scope of the invention.

What is claimed as new is:—

A spring wheel of the type described comprising a wheel felly, a band secured to said felly and having spaced openings therein, cup-shaped members having the inner ends thereof closed and received in said band openings, an outer band having openings therein received on the outer ends of said cup-shaped members, side spacing rings disposed between the felly band and the outer band connecting means between said side rings, plungers within said cup-shaped members, a cushioned tire supported on the outer ends of said plungers, and compression springs extending between said cups and plungers to hold the cups within the band openings and to cushion the tread of the wheel.

In testimony whereof I affix my signature.

WILLIAM H. SMITH.